(12) United States Patent
Dambrine et al.

(10) Patent No.: US 9,382,647 B2
(45) Date of Patent: Jul. 5, 2016

(54) FIBROUS STRUCTURE FOR A PART MADE OF A COMPOSITE MATERIAL AND HAVING A COMPLEX SHAPE

(75) Inventors: Bruno Jacques Gerard Dambrine, Le Chatelet en Brie (FR); Thierry Godon, Sevran (FR)

(73) Assignee: SNECMA, Paris (FR)

( * ) Notice: Subject to any disclaimer, the term of this patent is extended or adjusted under 35 U.S.C. 154(b) by 557 days.

(21) Appl. No.: 13/980,158

(22) PCT Filed: Jan. 9, 2012

(86) PCT No.: PCT/FR2012/050053
§ 371 (c)(1),
(2), (4) Date: Sep. 6, 2013

(87) PCT Pub. No.: WO2012/098323
PCT Pub. Date: Jul. 26, 2012

(65) Prior Publication Data
US 2013/0333793 A1    Dec. 19, 2013

(30) Foreign Application Priority Data
Jan. 18, 2011  (FR) ...................................... 11 50378

(51) Int. Cl.
*D03D 13/00* (2006.01)
*D03D 11/00* (2006.01)
*D03D 25/00* (2006.01)

(52) U.S. Cl.
CPC ................ *D03D 13/00* (2013.01); *D03D 11/00* (2013.01); *D03D 13/004* (2013.01); *D03D 25/005* (2013.01); *D10B 2505/02* (2013.01)

(58) Field of Classification Search
CPC ................. D03D 13/00; D03D 25/005; Y10T 442/3472; Y10T 442/3179
USPC .................................................. 442/199, 239
See application file for complete search history.

(56) References Cited

U.S. PATENT DOCUMENTS

| 5,899,241 A | 5/1999 | David et al. |
| 2006/0121809 A1 | 6/2006 | Goering |

(Continued)

FOREIGN PATENT DOCUMENTS

| EP | 0 856 601 | 8/1998 |
| EP | 1 666 651 | 6/2006 |

(Continued)

OTHER PUBLICATIONS

International Search Report Issued Mar. 26, 2012 in PCT/FR12/50053 Filed Jan. 9, 2012.
U.S. Appl. No. 13/993,472, filed Jun. 12, 2013, Godon et al.

*Primary Examiner* — Andrew Piziali
(74) *Attorney, Agent, or Firm* — Oblon, McClelland, Maier & Neustadt, L.L.P.

(57) ABSTRACT

A reinforcing fiber structure woven as a single piece for fabricating a composite material part and including: first and second fiber substructures, each fiber substructure including at least one independent portion obtained by multilayer weaving between a plurality of layers of warp yarns and a plurality of layers of weft yarns that are independent from the other substructure; and an assembly portion between the least first and second fiber substructures in which a plurality of adjacent layers of warp yarns of the first fiber substructure are interlinked by at least some of the warp yarns of the second fiber substructure.

10 Claims, 19 Drawing Sheets

(56) References Cited

U.S. PATENT DOCUMENTS

| | | |
|---|---|---|
| 2006/0137758 A1 | 6/2006 | Debaes et al. |
| 2010/0105269 A1 | 4/2010 | Goering et al. |
| 2011/0277869 A1 | 11/2011 | Coupe et al. |

FOREIGN PATENT DOCUMENTS

| | | |
|---|---|---|
| FR | 2 939 153 | 6/2010 |
| WO | 03 023104 | 3/2003 |

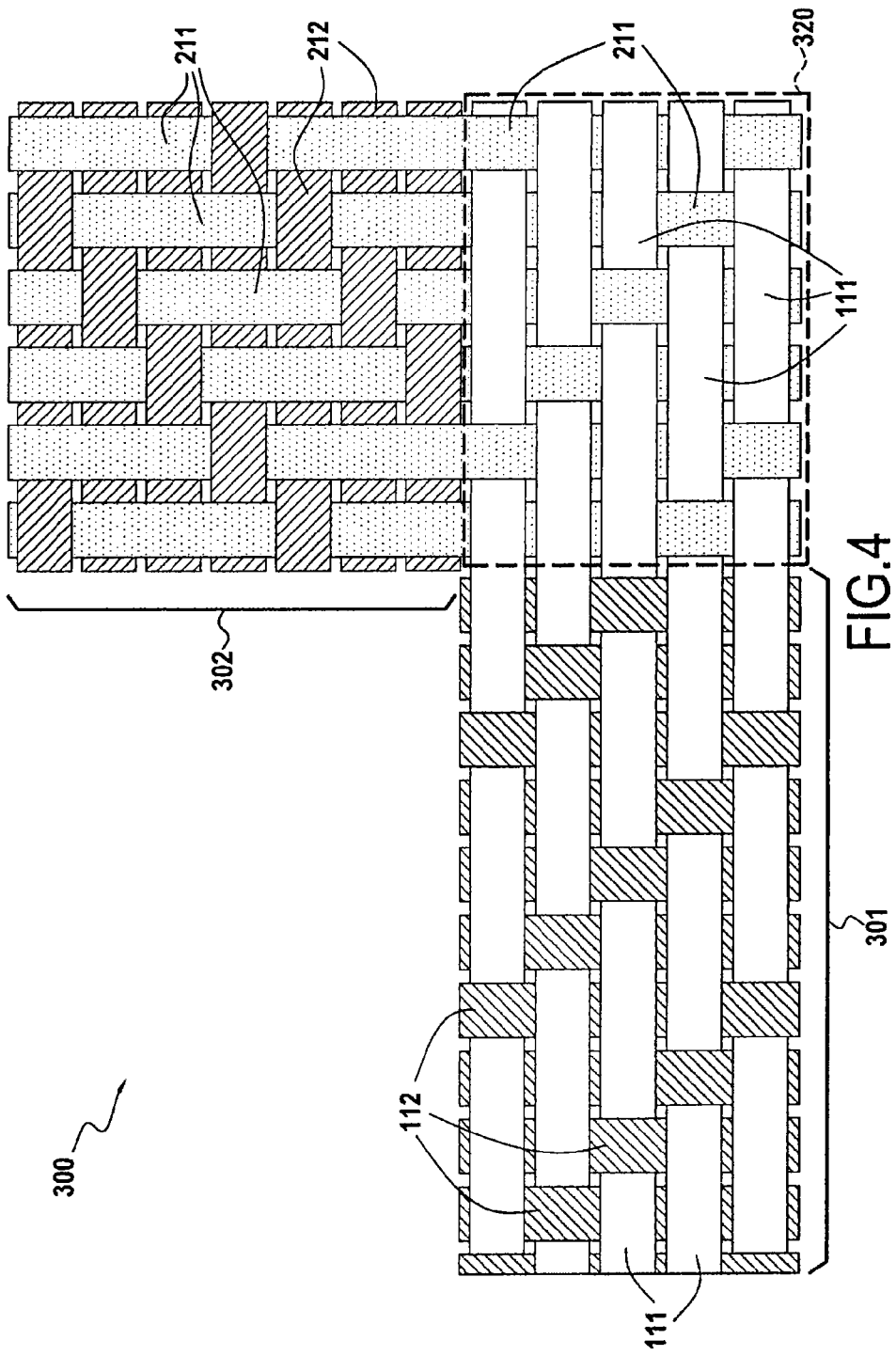

FIBROUS STRUCTURE FOR A PART MADE OF A COMPOSITE MATERIAL AND HAVING A COMPLEX SHAPE

BACKGROUND OF THE INVENTION

The present invention relates to making composite material parts and more particularly to making reinforcing fiber structures for such parts.

A field of application of the invention is more particularly making parts out of structural composite material, i.e. structural parts having fiber reinforcement that is densified by a matrix. Composite materials enable parts to be made of overall weight that is less than the same parts would have if they were made of a metallic material.

The cost of fabricating parts of standard shapes (simple shapes such as shrouds, plates, etc.) that are made out of composite material is usually well controlled since, in most situations, the fiber reinforcement of the part is made as a single piece presenting shape and dimensions close to those of the final part that is to be made, thereby minimizing the amount of scrap material that is cut off while enabling mechanical forces to be well distributed.

In contrast, making parts of shapes that are more complex out of composite material often requires portions to be cut off, and consequently gives rise to large amounts of scrap while making the fiber reinforcement of the part. Such losses during the making of these parts is economically penalizing since the fibers used are generally rather expensive.

OBJECT AND SUMMARY OF THE INVENTION

It is therefore desirable to be able to have parts of complex shapes without requiring large amounts of material to be scrapped while making their fiber reinforcement, and that present good mechanical properties.

To this end, according to the invention, there is provided a fiber reinforcing structure woven as a single piece for fabricating a composite material part, the structure being characterized in that it comprises at least:

first and second fiber substructures, each fiber substructure comprising at least one independent portion obtained by multilayer weaving between a plurality of layers of warp yarns and a plurality of layers of weft yarns that are independent from the other substructure; and an assembly portion between said at least first and second fiber substructures in which at least a plurality of layers of adjacent warp yarns or at least a plurality of layers of adjacent weft yarns of the first fiber substructure are interlinked by at least some of the warp yarns or at least some of the weft yarns of the second fiber substructure; and in that, in the assembly portion between the first and second substructures, at least a plurality of layers of adjacent warp yarns of the first fiber substructure are interlinked by at least some of the warp yarns of the second fiber substructure.

Thus, it is possible using a fiber structure of the invention to make parts out of composite material that present shapes that are complex, while avoiding excessive amounts of scrap and of cutting since the reinforcements of the various elements making up the final part can be woven independently of one another, i.e. more closely to the shape of the final element.

In addition, since the fiber substructures are assembled together by substituting the weft yarns of one of them with the warp yarns of the other, genuine interlinking with continuous weaving is achieved between the substructures, thereby making it possible to form coherent fiber reinforcement that enables the forces exerted on each component element of the part to be taken up by the structure as a whole.

In a first aspect of the invention, the assembly portion may present a weave that is similar to or different from the weave of one of the independent portions of the first and second fiber substructures.

In a second aspect of the invention, first and second fiber substructures may have the same number of layers of warp yarns or different numbers of layers of warp yarns.

In a third aspect of the invention, the first and second fiber substructures may have the same number of warp yarns per layer of warp yarns or different numbers of warp yarns per layer of warp yarns.

In a fourth aspect of the invention, the first and second fiber substructures may have yarns of the same weight or yarns of different weights.

The invention also provides a composite material part comprising a fiber structure of the invention densified with a matrix. This part may in particular constitute an attachment part such as a pipe clamp, a door having hinges incorporated therein, or a panel having stiffeners and a fastener tab integrated therein.

BRIEF DESCRIPTION OF THE DRAWINGS

Other characteristics and advantages of the invention appear from the following description of particular embodiments given as non-limiting examples and with reference to the accompanying drawings, in which:

FIG. 4 is a diagrammatic view of a fiber structure after cutting away the non-woven yarns of the FIG. 3 blank;

DETAILED DESCRIPTION OF EMBODIMENTS

The invention applies in general to making fiber structures suitable for constituting fiber reinforcement or preforms for use in fabricating composite material parts of large sizes and/or complex shapes and in which assembling together at least two fiber substructures makes it possible to avoid scrapping yarn excessively when cutting the reinforcement to shape.

In accordance with the invention, the fiber substructures for making up the fiber reinforcement of the part are assembled or butt joined by replacing the weft yarns of one of the substructures in an assembly portion between the substructures with the non-woven warp yarns of another substructure. Yarn continuity is thus obtained between the two substructures in their assembly portion, thus making it possible to take up forces exerted on the assembly portion throughout the resulting fiber structure constituting the fiber reinforcement of the composite material part.

Figure 1:
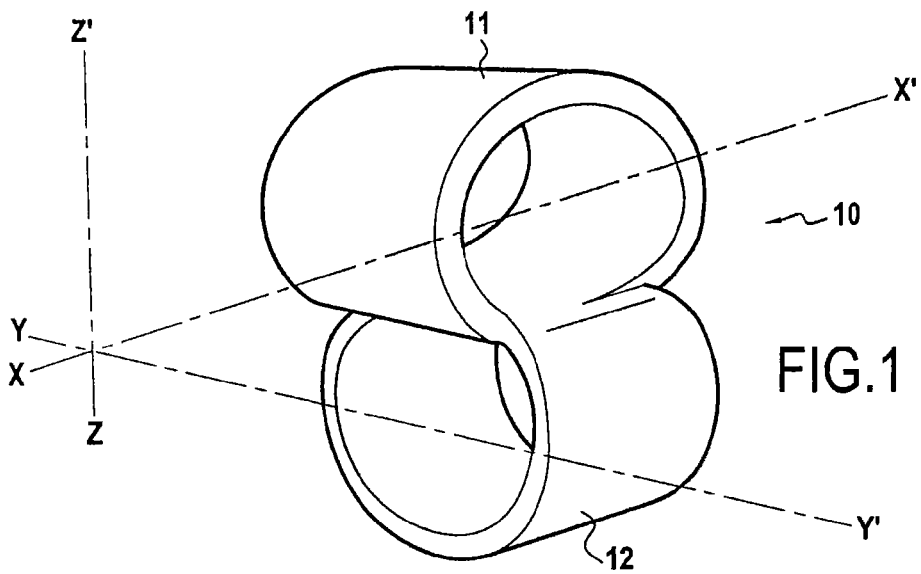
FIG. 1 is a perspective view of a fastener clamp constituting an embodiment of the invention.

FIG. 1 shows a fastener clamp 10 comprising a first cylindrical stiffener 11 allowing relative movements to take place in a direction XX' while providing rigidity against flattening and tearing movements in a direction ZZ', and a second cylindrical stiffener 12 allowing relative movements in a direction YY' that, like the direction XX', is perpendicular to the direction ZZ', thereby providing rigidity against flattening and tearing forces. By way of example, the fastener clamp 10 is for supporting or holding together two elements face to face, such as for example a thermal protection panel that is to be held facing a cold wall for protection (not shown in FIG. 1), the panel being subjected to stresses in various directions.

Figure 2A:
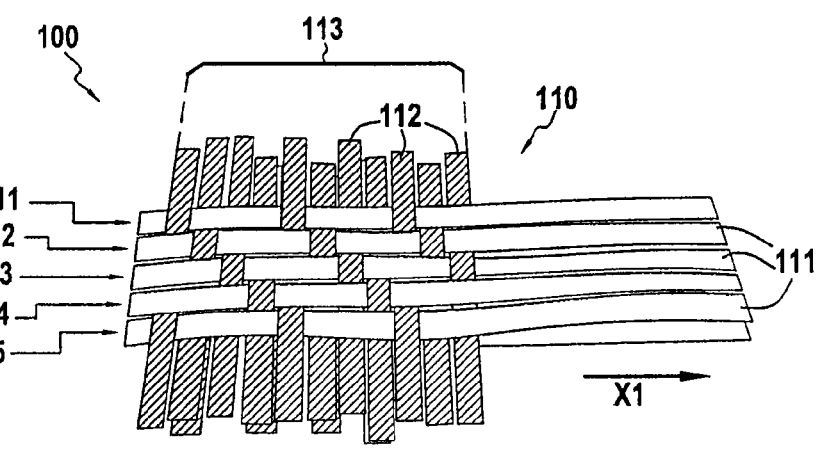
FIGS. 2A and 2B are respective perspective views of two fiber substructures for assembling together to fabricate the FIG. 1 fastener clamp.
Figure 2B:
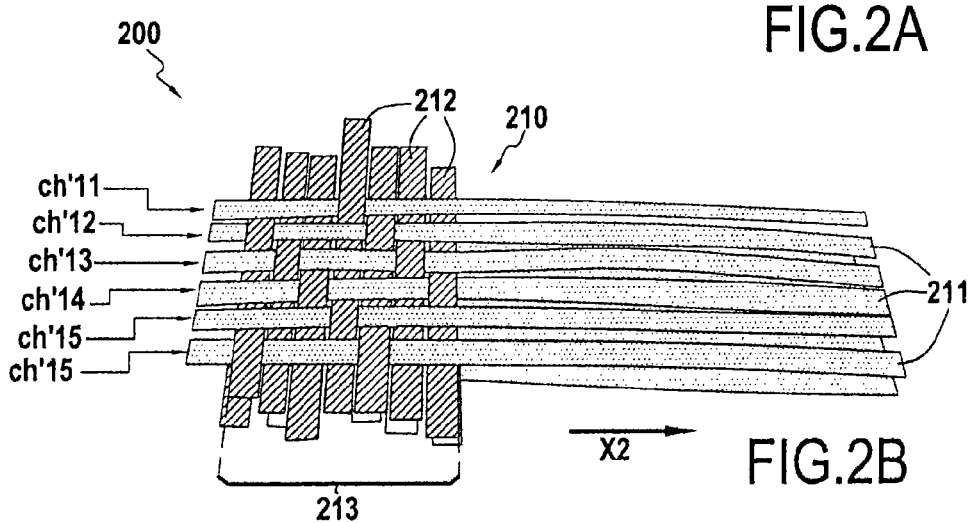

FIG. 2A is a very diagrammatic view of a fiber blank 110 for a first fiber substructure 100, while FIG. 2B shows a fiber blank 210 of a second fiber substructure 200.

As shown diagrammatically in FIG. 2A, the fiber blank 110 is obtained by multilayer weaving performed in known manner using a Jacquard type loom having a bundle of warp yarns 111 or twisted strands in a plurality of layers, the warp yarns being linked together by weft yarns 112. Likewise, as shown in FIG. 2B, the blank 210 is obtained by multilayer weaving of a plurality of layers of warp yarns 211 with a plurality of layers of weft yarns 212.

In FIG. 2A, the blank 110 has an independent portion 113, i.e. a portion obtained by multilayer weaving between the plurality of layers of warp yarns 111 and the plurality of layers of weft yarns 112 in a manner that is independent relative to the warp yarns and the weft of the blank 210 of the other substructure 200. In FIG. 2B, the blank 210 has an independent portion 213 i.e. a portion obtained by multilayer weaving between the plurality of layers of warp yarns 211 and the plurality of layers of weft yarns 212 in a manner that is independent relative to the warp yarns and weft yarns of the blank 110 of the other substructure 100.

As shown in FIGS. 2A and 2B, the warp yarns 111 and 211 respectively of the blanks 110 and 210 are not woven beyond the independent portions 113 and 213 so as to leave an excess length of warp yarns for assembling together the blanks 110 and 210 of the two substructures 100 and 200.

Figure 3:
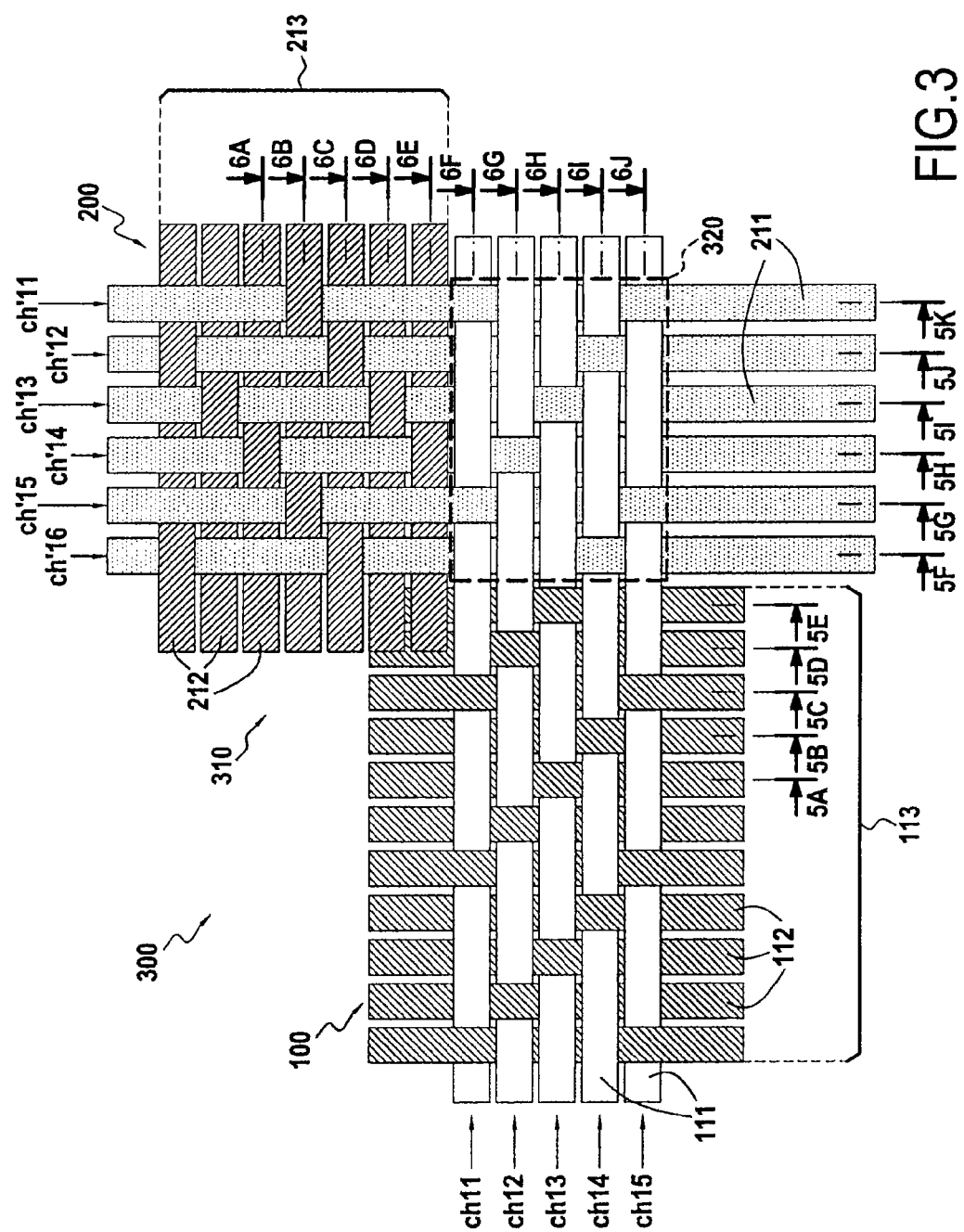
FIG. 3 is a diagrammatic view showing a fiber blank resulting from assembling together the two substructures of FIGS. 2A and 2B in accordance with the invention.
Figure 5A:
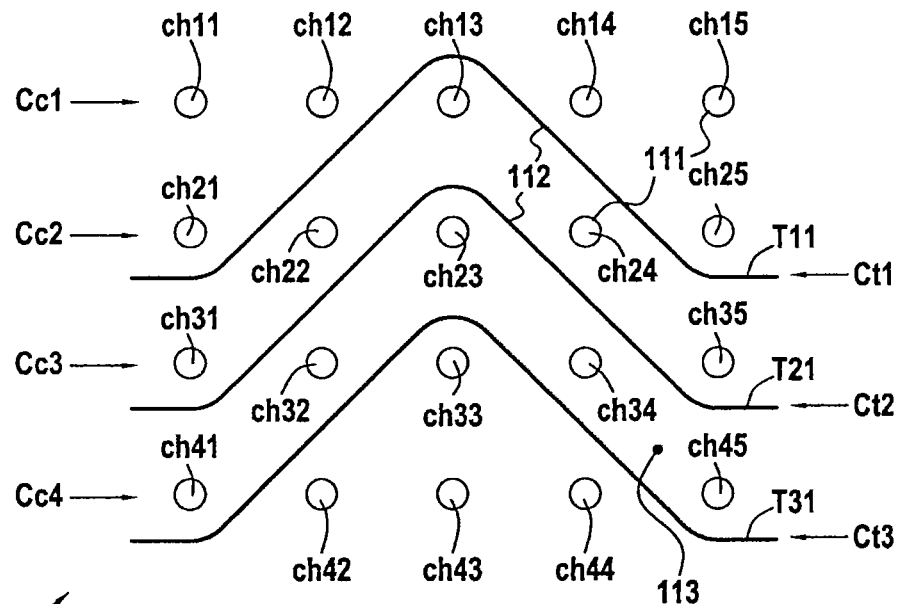
FIGS. 5A to 5E are weft-section views in the weft direction of the FIG. 2A substructure on a larger scale showing a plurality of successive weave planes in a portion of the FIG. 3 fiber blank corresponding to an independent portion of the FIG. 2A fiber substructure.
Figure 5B:
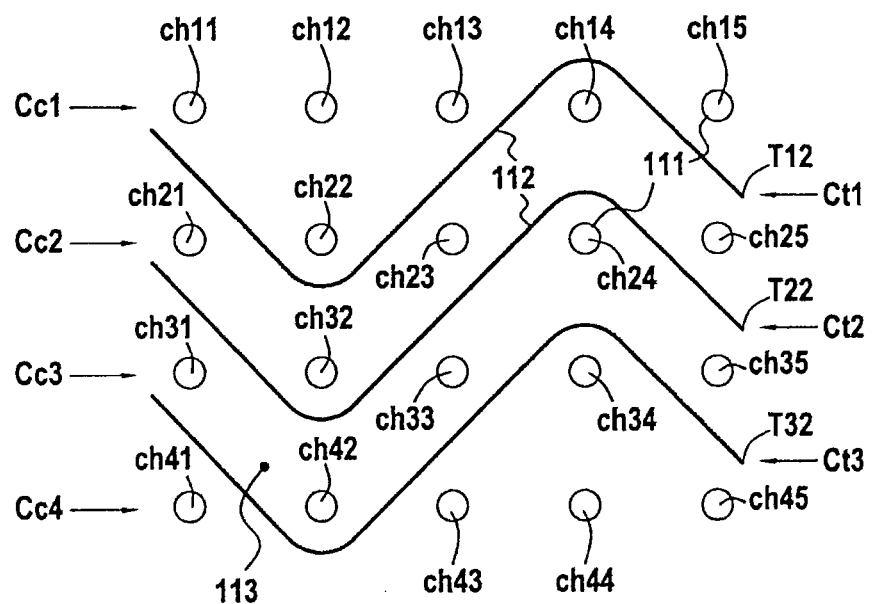
Figure 5C:
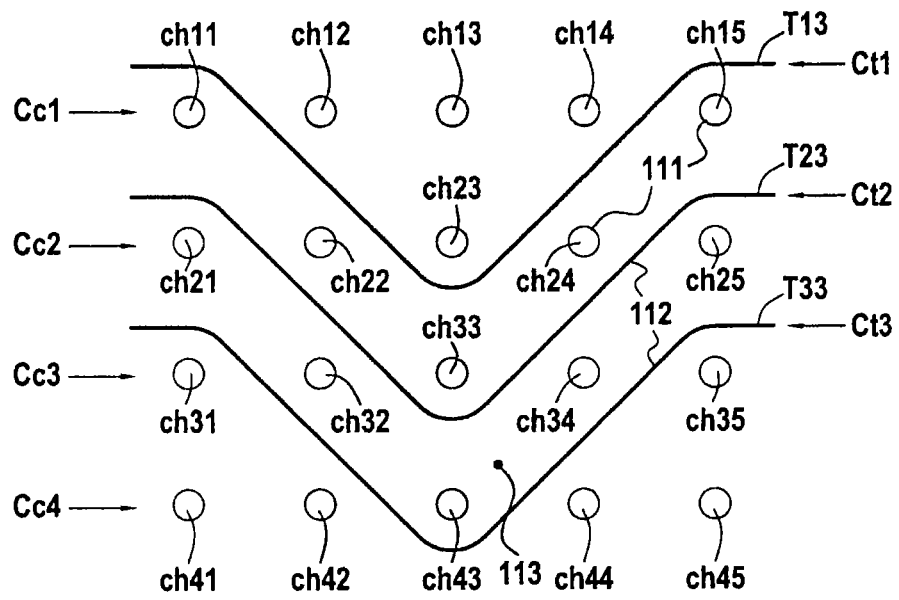
Figure 5D:
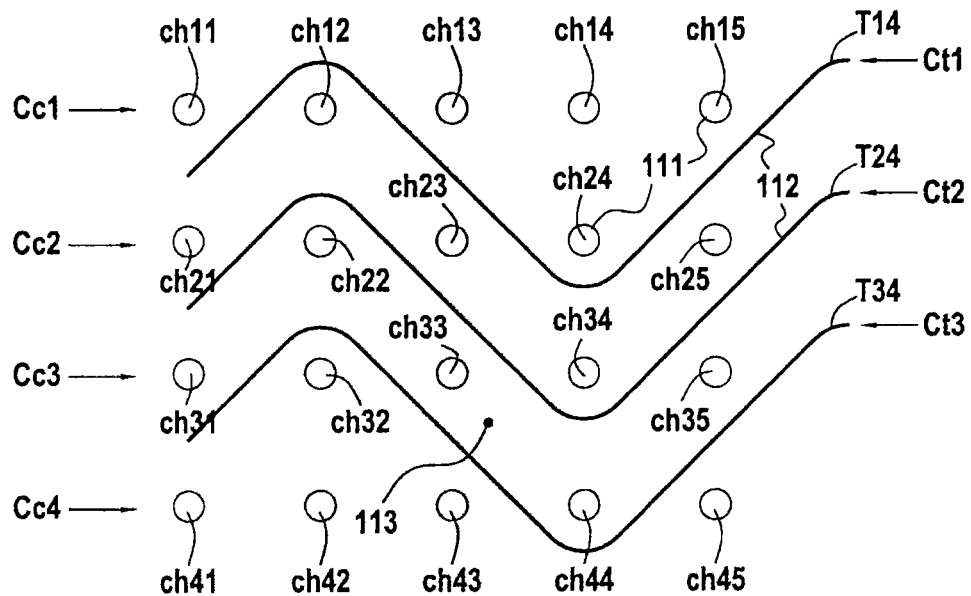
Figure 5E:
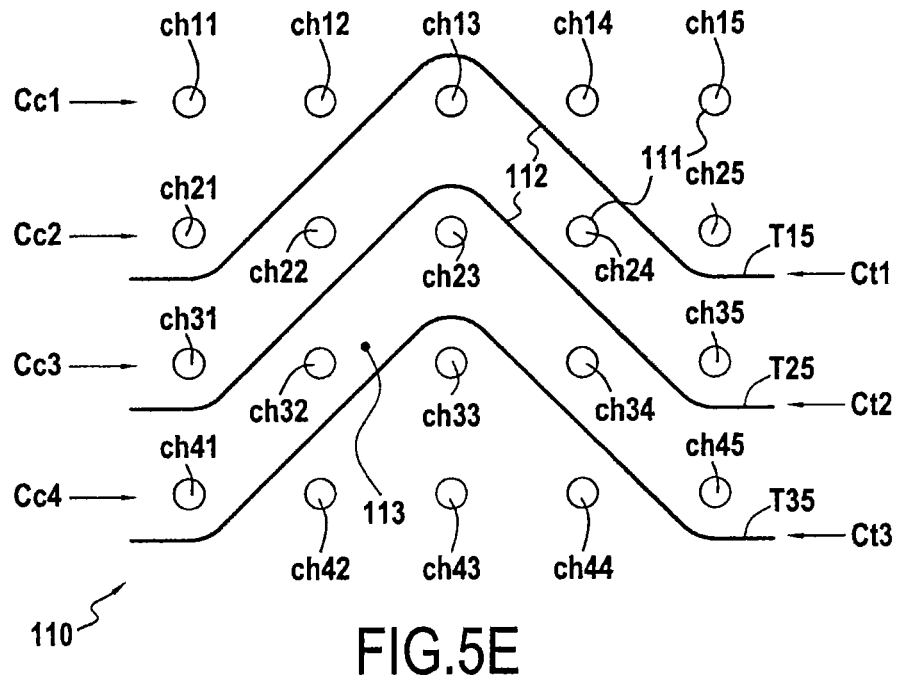
Figure 5F:
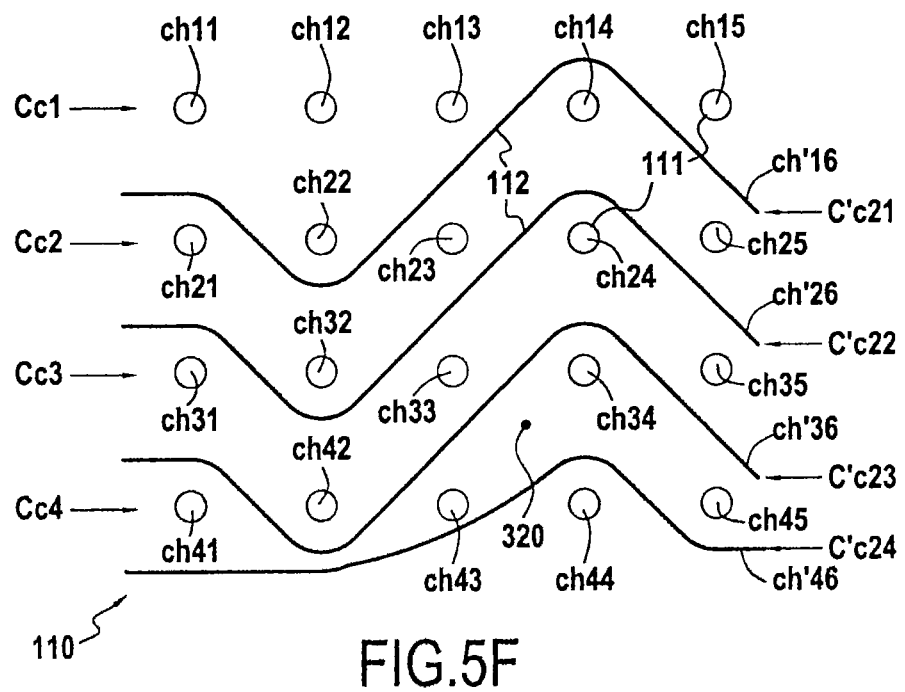
FIGS. 5F to 5K are weft-section views on a larger scale in the weft direction of the FIG. 2A substructure, or warp-section views in the warp direction of the FIG. 2B substructure showing a plurality of successive weave planes in a portion of the FIG. 3 fiber blank corresponding to an assembly portion between the substructures of FIGS. 2A and 2B.
Figure 5G:
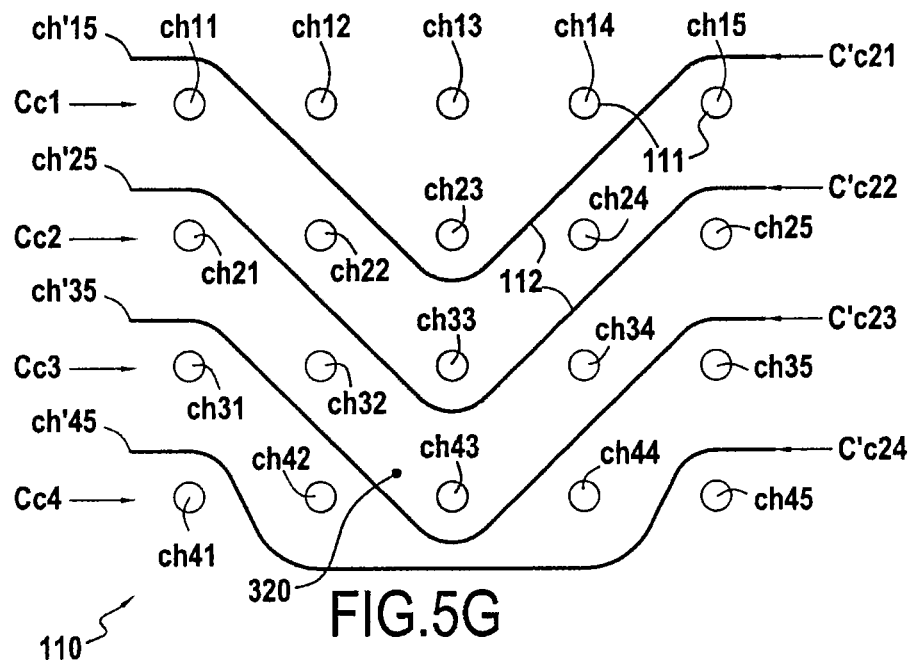
Figure 5H:
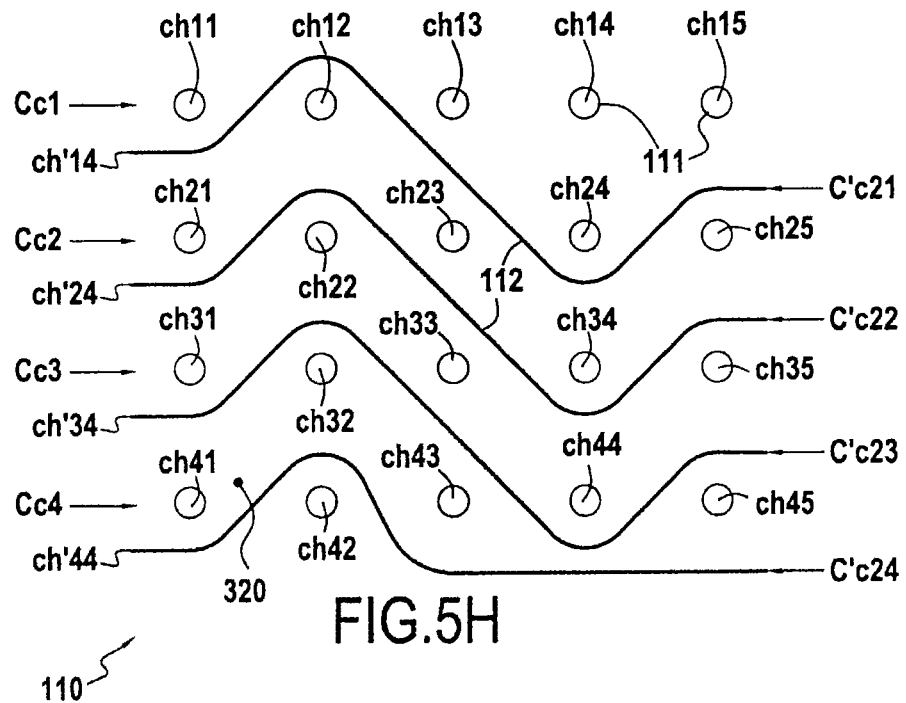
Figure 5I:
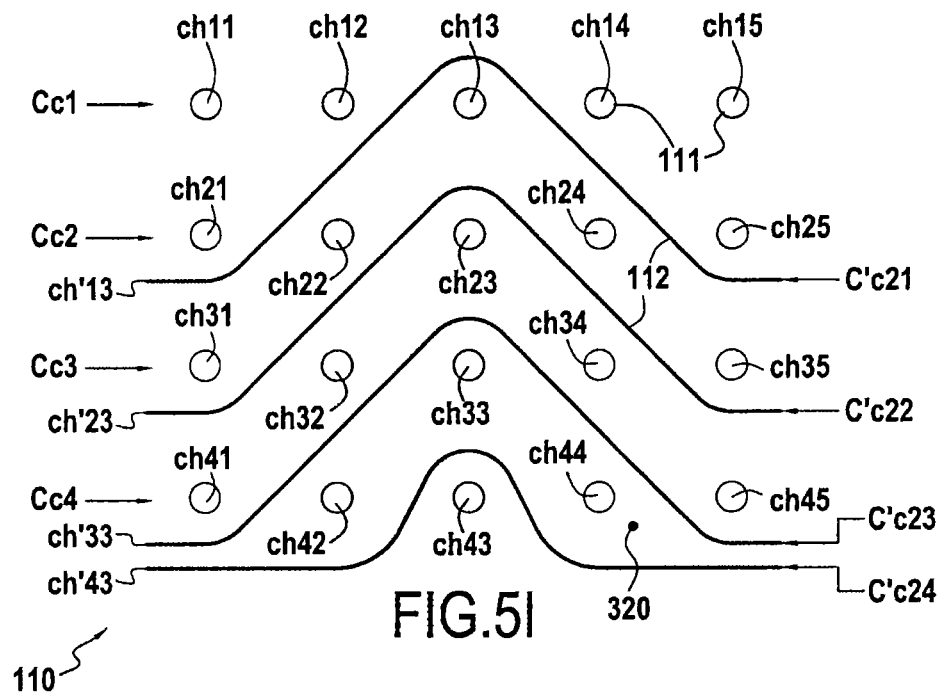
Figure 5J:
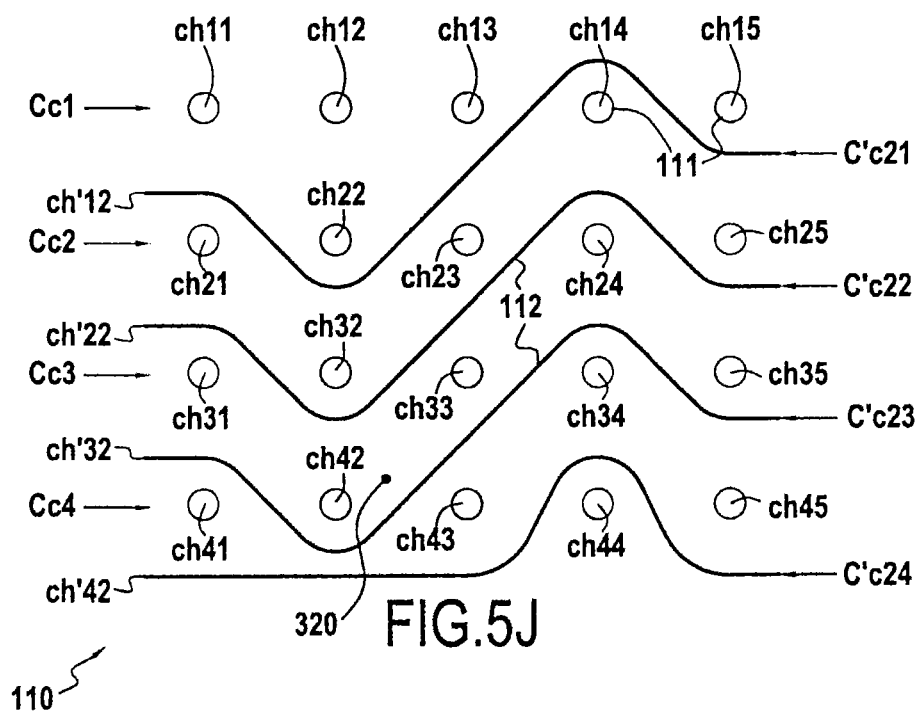
Figure 5K:
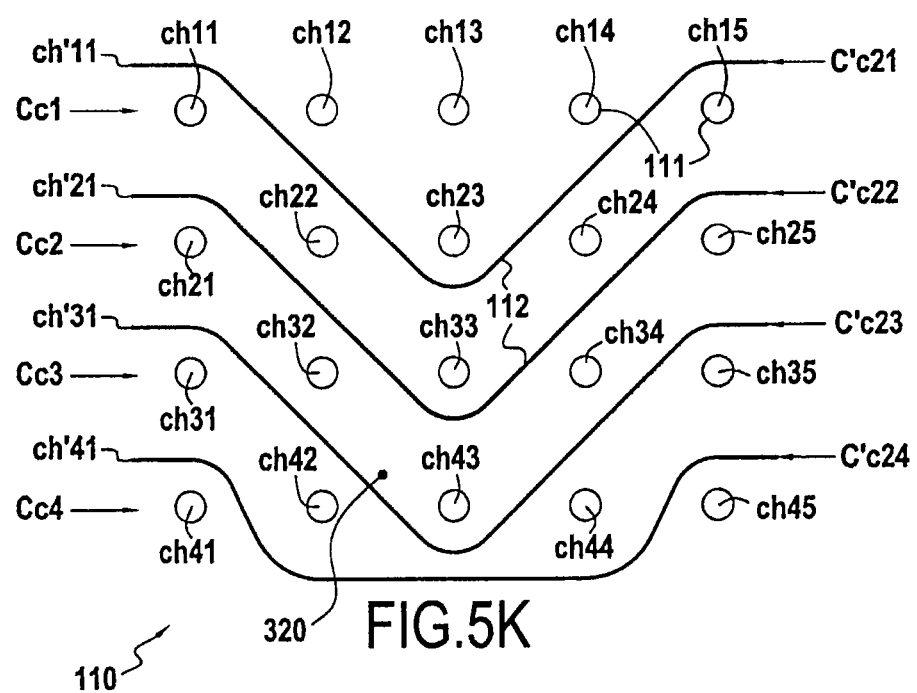
Figure 6A:
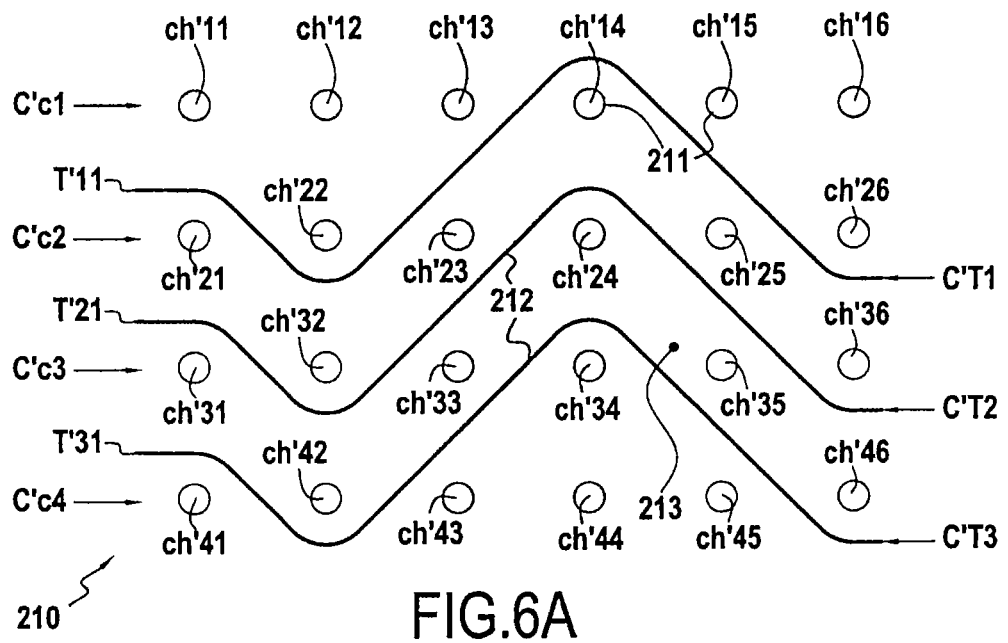
FIGS. 6A to 6E are weft-section views in the weft direction of the FIG. 2B substructure on a larger scale showing a plurality of successive weave planes in a portion of the FIG. 3 fiber blank corresponding to an independent portion of the FIG. 2B fiber substructure.
Figure 6B:
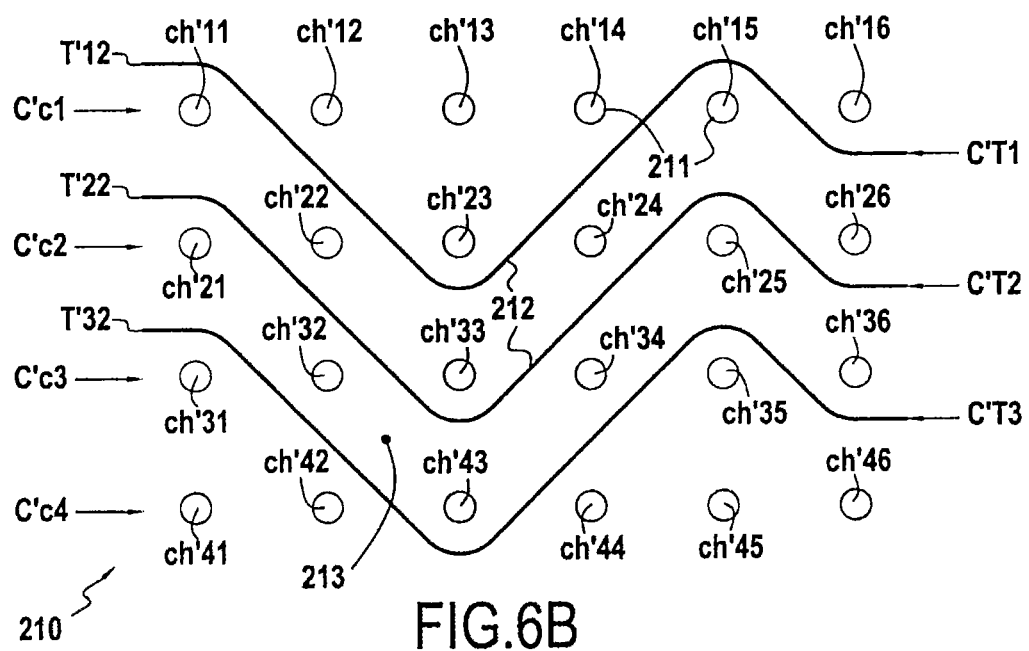
Figure 6C:
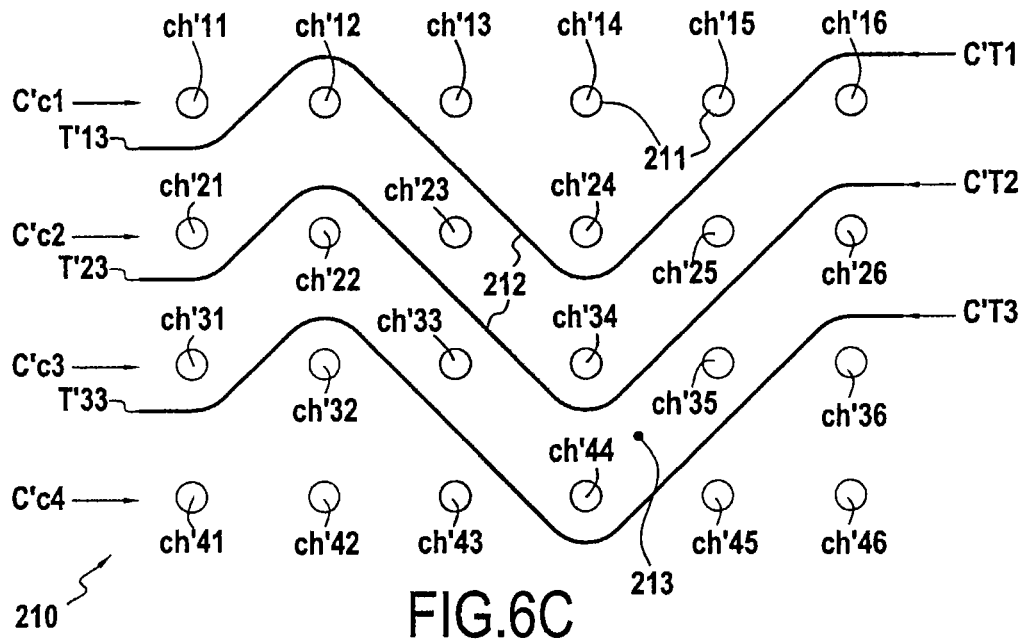
Figure 6D:
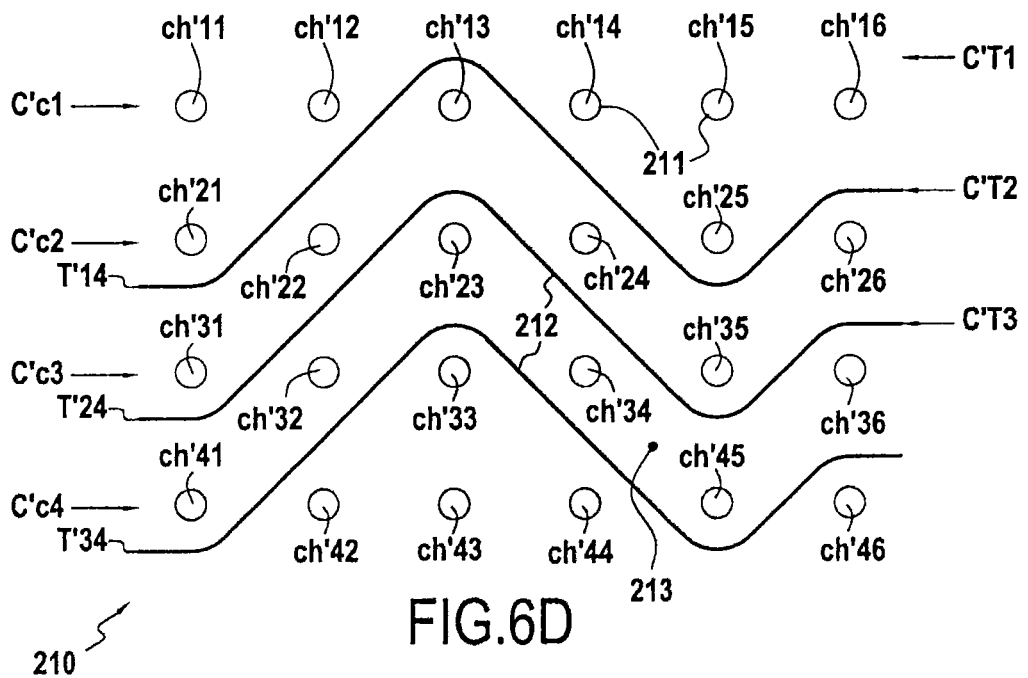
Figure 6E:
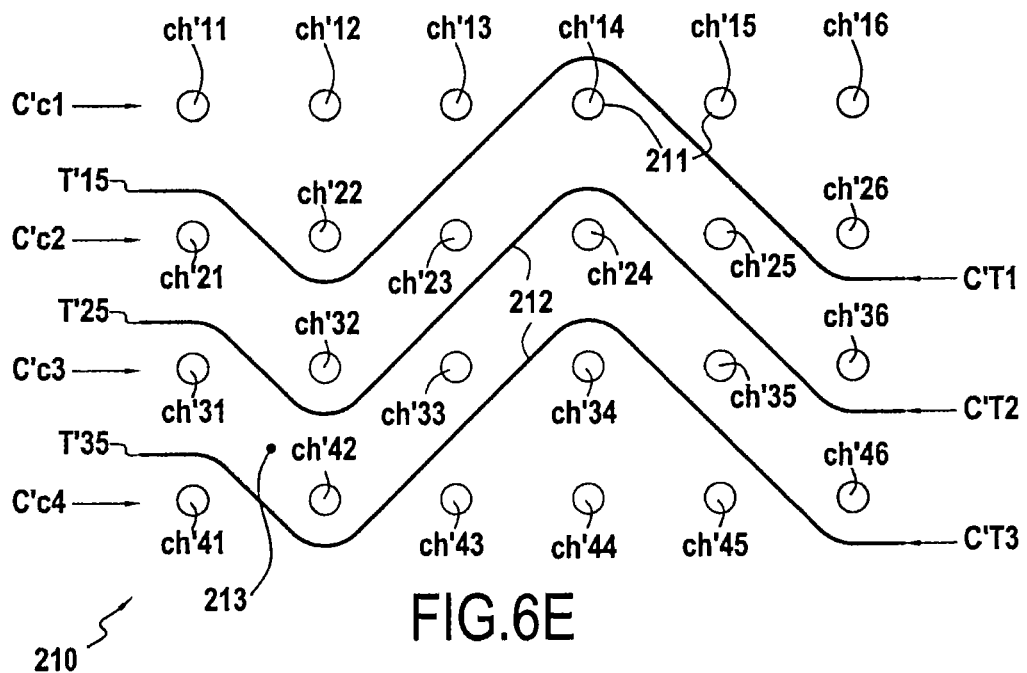
Figure 6F:
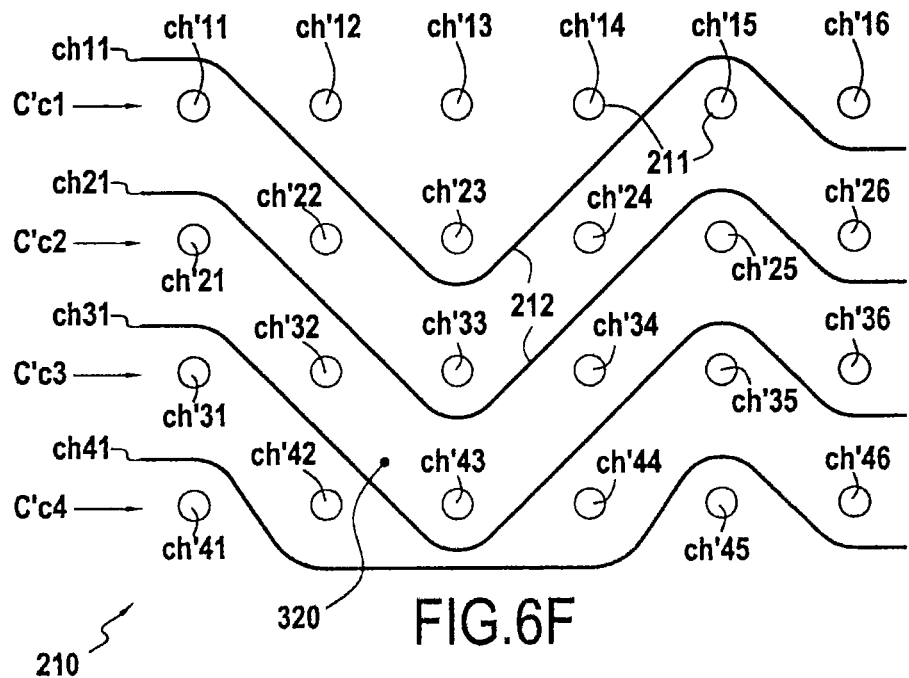
FIGS. 6F to 6J are weft-section views on a larger scale in the weft direction of the FIG. 2B substructure, or warp-section views in the warp direction of the FIG. 2A substructure showing a plurality of successive weave planes in a portion of the FIG. 3 fiber blank corresponding to an assembly portion between the substructures of FIGS. 2A and 2B.
Figure 6G:
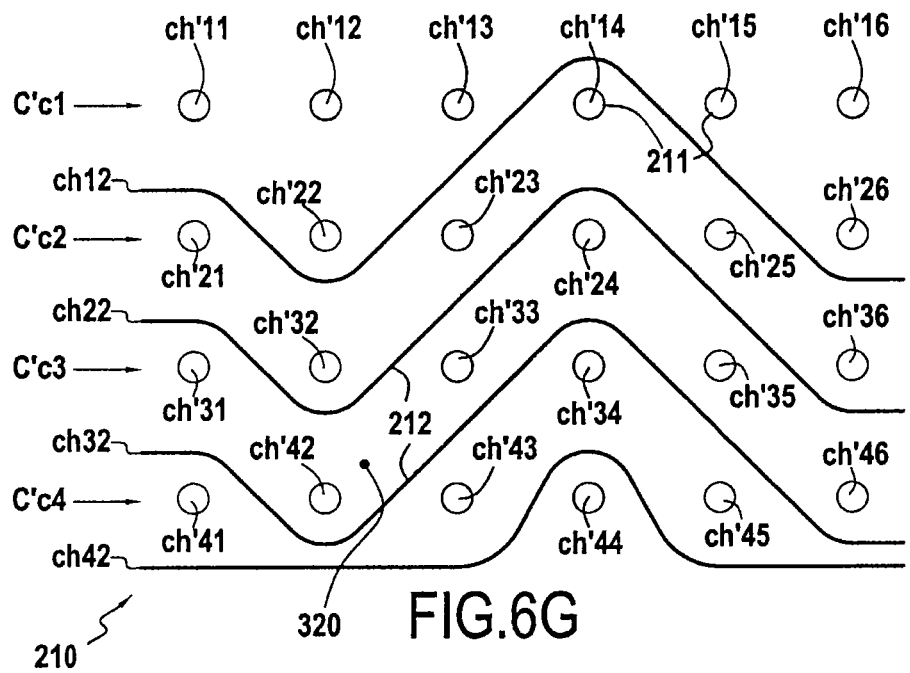
Figure 6H:
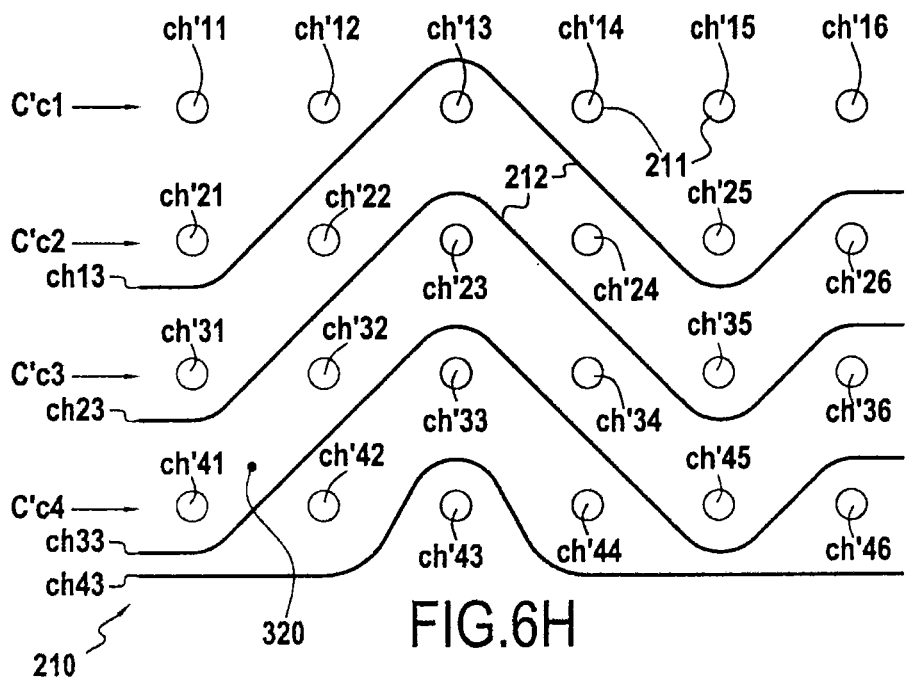
Figure 6I:
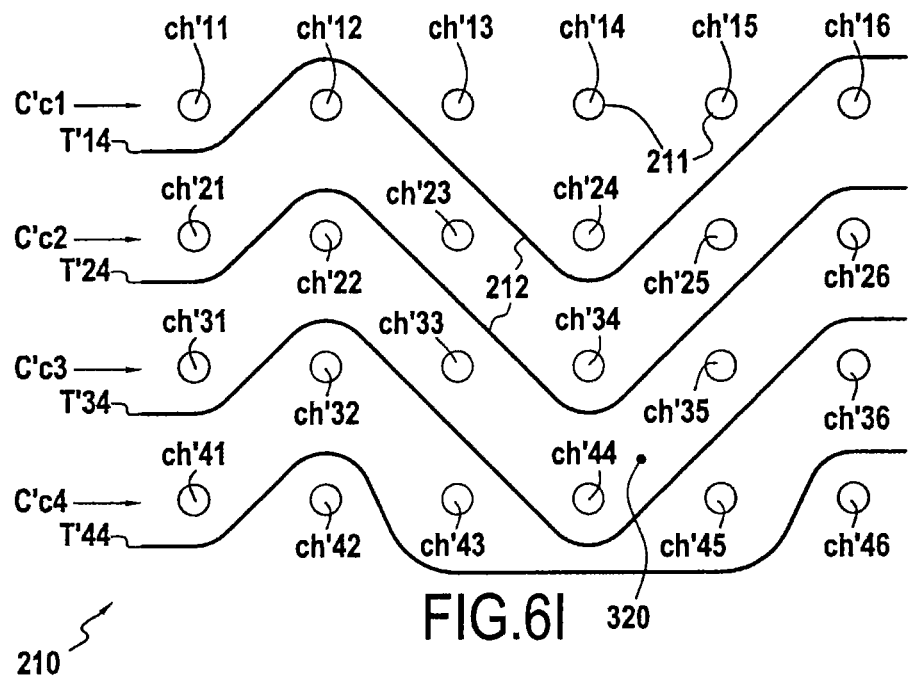
Figure 6J:
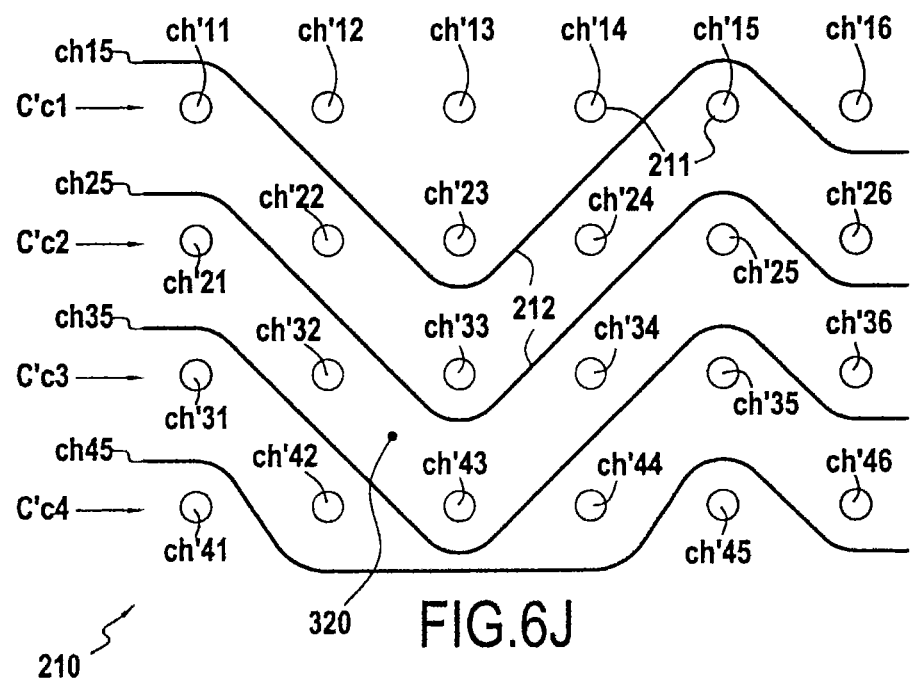

FIG. 3 shows a blank 310 of a fiber structure 300 obtained by uniting the two substructures 100 and 200. More precisely, beyond the independent portion 113 of the blank 110, the layers of warp yarns 111 are no longer linked together with the weft yarns 112, but rather with the warp yarns 211 of the blank 210, which is placed perpendicularly to the blank 110 concerning the directions of their respective warp yarns in order to form an assembly portion 320. In other words, in the assembly portion 320, the weft yarns 112 are replaced by the warp yarns 211 of the blank 200. This produces a single piece woven fiber structure with weaving continuity in the assembly portion 320, i.e. without interruption in the continuity of the warp yarns 111 and 211.

In the example shown, the multilayer weaving used both for making the independent portions 113 and 213 and for making the assembly portion 320 is an "interlock" weave. The term "interlock" weave is used herein to mean a weave in which each layer of weft yarns interlinks a plurality of layers of warp yarns, with all of the yarns in a given weft column having the same movement in the plane of the weave.

Other types of multilayer weave could be used, such as in particular those described in document WO 2006/136755, the content of which is incorporated herein by way of reference.

Particularly, but not exclusively, the fiber blank of the invention may be woven from yarns made of fibers of carbon, of glass, of aramid, of ceramic such s silicon carbide, or indeed of metal such as titanium, or indeed yarns of SiC/titanium or SiC/boron.

One way of performing multilayer weaving with an interlock weave in the independent portion 113 of the substructure 100 is shown diagrammatically in FIGS. 5A to 5E which are respective enlarged fragmentary views in successive weft section planes (sections 5A to 5E marked in FIGS. 2A and 3). In this example, the blank 110 has four layers $C_{C1}$ to $C_{C4}$ of warp yarns 111 extending in the direction $X_1$ (FIG. 2A), each layer $C_{C1}$ to $C_{C4}$ comprising five respective warp yarns $ch_{11}$-$ch_{15}$, $ch_{21}$-$ch_{25}$, $ch_{31}$-$ch_{35}$, and $ch_{41}$-$ch_{45}$. In FIGS. 5A to 5E the four layers of warp yarns $C_{C1}$ to $C_{C4}$ are interlinked by three layers of weft yarns $C_{T1}$ to $C_{T3}$, each comprising in the five successive planes shown in FIGS. 5A to 5E the weft yarns $T_{11}$-$T_{15}$, $T_{21}$-$T_{25}$, and $T_{31}$-$T_{35}$. For simplification purposes, only four layers of warp yarns and three layers of weft yarns are shown herein, naturally in the dimensions of the fiber structure that is it desired to obtain (width and thickness), which structure may be made with some number of layers of warp yarns and of weft yarns and some number of yarns per layer that are much greater.

One way of performing multilayer weaving with an interlock weave in the independent portion 213 of the substructure 200 is shown diagrammatically in FIGS. 6A to 6E which are respective enlarged fragmentary views in successive weft section planes (sections 6A to 6E marked in FIGS. 2B and 3). In this example, the blank 210 has four layers $C'_{C1}$ to $C'_{C4}$ of warp yarns 211 extending in the direction $X_2$ (FIG. 2B), each layer $C'_{C1}$ to $C'_{C4}$ comprising six respective warp yarns $ch'_{11}$-$ch'_{16}$, $ch'_{21}$-$ch'_{26}$, $ch'_{31}$-$ch'_{36}$, and $ch'_{41}$-$ch'_{46}$. In FIGS. 6A to 6E the four layers of warp yarns $C'_{C1}$ to $C'_{C4}$ are interlinked by three layers of weft yarns $C'_{T1}$ to $C'_{T3}$, each comprising in the five successive planes shown in FIGS. 6A to 6E the weft yarns $T'_{11}$-$T'_{15}$, $T'_{21}$-$T'_{25}$, and $T'_{31}$-$T'_{35}$. For simplification purposes, only four layers of warp yarns and three layers of weft yarns are shown herein, naturally in the dimensions of the fiber structure that is it desired to obtain (width and thickness), which structure may be made with some number of layers of warp yarns and of weft yarns and some number of yarns per layer that are much greater.

FIGS. 5F to 5K are respective enlarged fragmentary views of successive planes of a weave of the assembly portion 320 in weft section in the weft direction of the first substructure 100 or in warp section in the warp direction $X_2$ of the second substructure 200 (sections 5F to 5K marked in FIG. 3). As can be seen looking at FIGS. 5F to 5K, the four layers of warp yarns $C_{C1}$ to $C_{C4}$ are no longer interlinked by the three layers of weft yarns $C_{T1}$ to $C_{T3}$, but by the warp yarns of the layers of warp yarns $C'_{C1}$ to $C'_{C4}$ of the blank 210 of the second substructure 200. More precisely, in the weave plane of FIG. 5F, which corresponds to the first weave plane of the assembly portion 320 situated immediately after the last weave plane of the independent portion 113 of the first substructure 100 (FIG. 5E) in the direction $X_1$, the layers of warp yarns $C_{C1}$ to $C_{C4}$ comprising the warp yarns $ch_{11}$-$ch_{15}$, $ch_{21}$-$ch_{25}$, $ch_{31}$-$ch_{35}$, and $ch_{41}$-$ch_{45}$ of the first substructure 100 are interlinked by the warp yarns $ch'_{16}$, $ch'_{26}$, $ch'_{36}$, and $ch'_{46}$ corresponding to the sixth column of warp yarns 211 of the blank 210 of the second substructure 200. In similar manner, in the weave planes of FIGS. 5G to 5K, the layers of warp yarns $C_{C1}$ to $C_{C4}$ are interlinked respectively by the yarns $ch'_{15}$-$ch'_{45}$, $ch'_{14}$-$ch'_{44}$, $ch'_{13}$-$ch'_{43}$, $ch'_{12}$-$ch'_{42}$, and $ch'_{11}$-$ch'_{41}$, corresponding respectively to the fifth to first columns of warp yarns 211 of the blank 200.

FIGS. 6F to 6J are respective enlarged fragmentary views of successive planes of a weave of the assembly portion 320 in weft section in the weft direction of the second substructure 200 or in warp section in the warp direction $X_1$ of the first substructure 100 (sections 6F to 6J marked in FIG. 3). As can be seen looking at FIGS. 6F to 6J, the four layers of warp yarns $C'_{C1}$ to $C'_{C4}$ are no longer interlinked by the three layers of weft yarns $C'_{T1}$ to $C'_{T3}$, but by the warp yarns of the layers of warp yarns $C_{C1}$ to $C_{C4}$ of the blank 110 of the first substructure 100. More precisely, in the weave plane of FIG. 6F, which corresponds to the first weave plane of the assembly portion 320 situated immediately after the last weave plane of the independent portion 213 of the second substructure 200 (FIG. 6E) in the direction $X_2$, the layers of warp yarns $C'_{C1}$ to $C'_{C4}$ comprising the warp yarns $ch'_{11}$-$ch'_{16}$, $ch'_{21}$-$ch'_{26}$, $ch'_{31}$-$ch'_{36}$, and $ch'_{41}$-$ch'_{46}$ of the first substructure 100 are interlinked by the warp yarns $ch_{11}$, $ch_{21}$, $ch_{31}$, and $ch_{41}$ corresponding to the first column of warp yarns 111 of the blank 110 of the first substructure 100. In similar manner, in the weave planes of FIGS. 6G to 6J, the layers of warp yarns $C'_{C1}$ to $C'_{C4}$ are interlinked respectively by the yarns $ch'_{12}$-$ch'_{42}$, $ch'_{13}$-$ch'_{43}$, $ch'_{14}$-$ch'_{43}$, and $ch'_{15}$-$ch'_{45}$, corresponding respectively to the second to fifth columns of warp yarns 111 of the blank 100.

In the presently described example, the assembly portion 320 presents, in section in the warp direction $X_1$ of the blank 110 (FIGS. 5F to 5K), a weave that is identical to (same weave type) and continuous with (same succession of weave planes) the weave of the independent portion 113 of the blank 110 of the first substructure, with the exception of the portions woven with the warp yarns $ch_{41}$-$ch_{45}$ and $ch'_{41}$-$ch'_{46}$ that do not directly substitute the weft yarns present in the independent portions 113 and 213. In the warp direction $X_2$ of the blank 210 (FIGS. 6F to 6J), the assembly portion also presents a weave that is identical to (of the same type as) the weave of the independent portion 213 of the blank 210 of the first substructure, with the exception of the portions woven with the warp yarns $ch_{41}$-$ch_{45}$ and $ch'_{41}$-$ch'_{46}$, but which is not continuous therewith, i.e. it does not follow the exact repetition of the weave planes in the independent portion 213 of the blank 200 (FIGS. 6A to 6E).

At the end of weaving, the non-woven ends of the warp yarns and of the weft yarns are cut off in order to extract the fiber structure 300 shown in FIG. 4 as produced by the multilayer weaving and before any shaping, the structure 300 having a first free strip 301 corresponding to the independent portion 113 of the first fiber substructure 100 and a second free strip 302 corresponding to the independent portion 213 of the second fiber substructure 200, with the two free strips 301 and 302 being linked together by the assembly portion 320.

Figure 7:
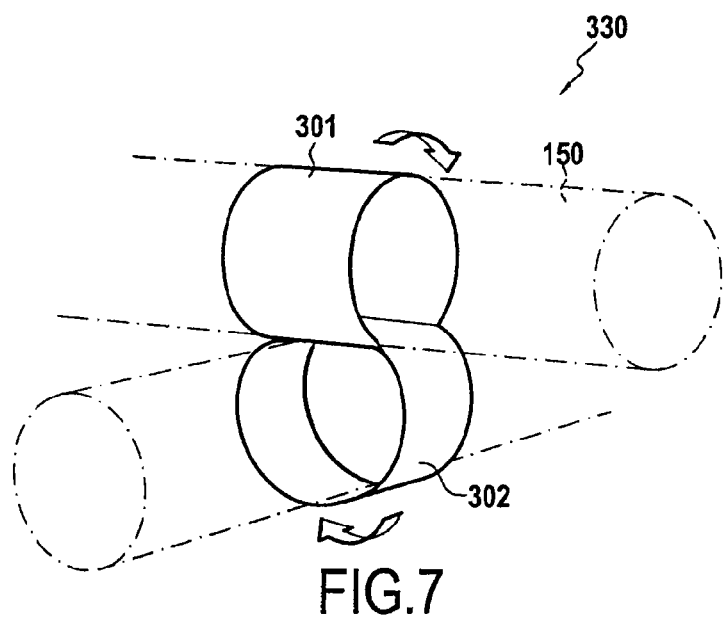
FIG. 7 is a diagrammatic perspective view showing the shaping of the FIG. 4 fiber structure before densification.

Thereafter, the fiber blank is densified in order to form the fastener clamp 10 of FIG. 1. For this purpose, and as shown in FIG. 7, the first free strip 301 of the fiber structure 300 is shaped around a first mandrel 150 and the second free strip 302 of the structure 300 is shaped around a second mandrel 160, the free ends of the strips 301 and 302 possibly being stitched to the assembly portion 320 prior to densification. This produces a fiber preform 330 ready to be densified.

Densification of the fiber preform consists in filling in the pores in the preform, in all or a fraction of its volume, by means of the material that constitutes the matrix.

The matrix of the composite material constituting the structure of streamlined profile may be obtained in known manner using the liquid technique.

The liquid technique consists in impregnating the preform with a liquid composition containing an organic precursor for the material of the matrix. The organic precursor is conventionally in the form of a polymer, such as a resin, possibly diluted in a solvent. The preform is placed in a mold that may be closed in leaktight manner and that has a cavity with the shape of the final molded part. In this example, the preform is placed in a mold and a countermold respectively presenting the outside shape and the inside shape (like the mandrels 150 and 160) of the fastener clamp that is to be made. Thereafter, the mold is closed and the liquid precursor (e.g. a resin) for the matrix is injected throughout the cavity in order to impregnate all of the fiber portion of the preform.

The precursor is transformed into an organic matrix, i.e. it is polymerized, by applying heat temperature, generally by heating the mold, after eliminating any solvent and curing the polymer, the preform still being held in the mold having a shape that matches the shape of the part that is to be made. The organic matrix may in particular be obtained using epoxy resin such as for example, a high performance epoxy resin, or by using liquid precursors for carbon or ceramic matrices.

When forming a carbon or ceramic matrix, the heat treatment consists in pyrolyzing the organic precursor in order to transform the organic matrix into a carbon or ceramic matrix depending on the precursor used and on the pyrolysis conditions. By way of example, liquid precursor for carbon may be resins having a relatively high coke content, such as phenolic resins, whereas liquid precursors for ceramic, and in particular for SiC, may be resins of the polycarbosilane (PCS) type or of the polytitanocarbosilane (PTCS) type or of the polysilazane (PSZ) type. Several consecutive cycles from impregnation through to heat treatment may be performed in order to achieve the desired degree of densification.

When using metal yarns and/or metallic ceramic fibers, the matrix may be formed for example by using the hot isostatic pressing (HIP) method.

In an aspect of the invention, the fiber preform may be densified by the well-known method of resin transfer molding (RTM). In the RTM method, the fiber preform 330 with the mandrels 150 and 160 (FIG. 7) is placed in a mold having the outside shape of the fastener clamp that is to be made. A thermosetting resin is injected into the inside space defined between the part made of rigid material and the mold and that includes the fiber preform. A pressure gradient is generally established in this inside space between the location into which the resin is injected and discharge orifices for the resin in order to control and optimize impregnation of the preform with the resin.

By way of example, the resin used may be an epoxy resin. Resins suitable for RTM methods are well known. They preferably present low viscosity in order to make them easier to inject between the fibers. The temperature class and/or the chemical nature of the resin is/are determined as a function of the thermomechanical stresses to which the part is to be subjected. Once the resin has been injected throughout the reinforcement, it is polymerized by heat treatment in application of the RTM method.

After injection and polymerization, the part is unmolded. The part is finally trimmed in order to remove excess resin and its chamfers are machined in order to obtain the pipe clamp 10 of FIG. 1.

By making it possible to assemble together a plurality of fiber substructures that are woven independently of one another prior to being assembled together, the present invention makes it possible to make fiber reinforcement preforms having the shape and the dimensions of the final part that is to be made out of composite material, thereby greatly minimizing the amount of cutting that needs to be performed and the quantity of yarn that needs to be scrapped.

Conserving warp yarn continuity of the fiber substructures in their assembly portion makes it possible to form a resulting fiber structure as a single piece suitable for forming a single fiber reinforcement that presents good mechanical strength at all points.

In the above-described example the two fiber substructures 100 and 200 used for making up the fiber structure 300 both the same weave and they have yarns of the same kind (e.g. made of carbon fiber), and presenting the same weight. Nevertheless, in the present invention, the fiber substructures used for forming the resulting fiber structure by assembly may present different types of multilayer weave and they may comprise yarns of different kinds and of different weights.

Furthermore, the assembly portion between the two substructures may present a weave that is similar to the weave of one of the independent portions of the fiber substructures as in the above-described example, or it may present a weave that is different from the weaves of the independent portions of the assembled-together fiber substructures.

In another variant embodiment of the invention, the number of layers of warp yarns and/or the number of warp yarns per layer of warp yarns may be identical or different between the assembled-together fiber substructures.

The shapes and the dimensions of the composite material parts that are made with the fiber structure of the invention may be varied and in particular they are not limited to parts in the form of a pipe clamp, but extend to all other types of shapes.

Figure 8:
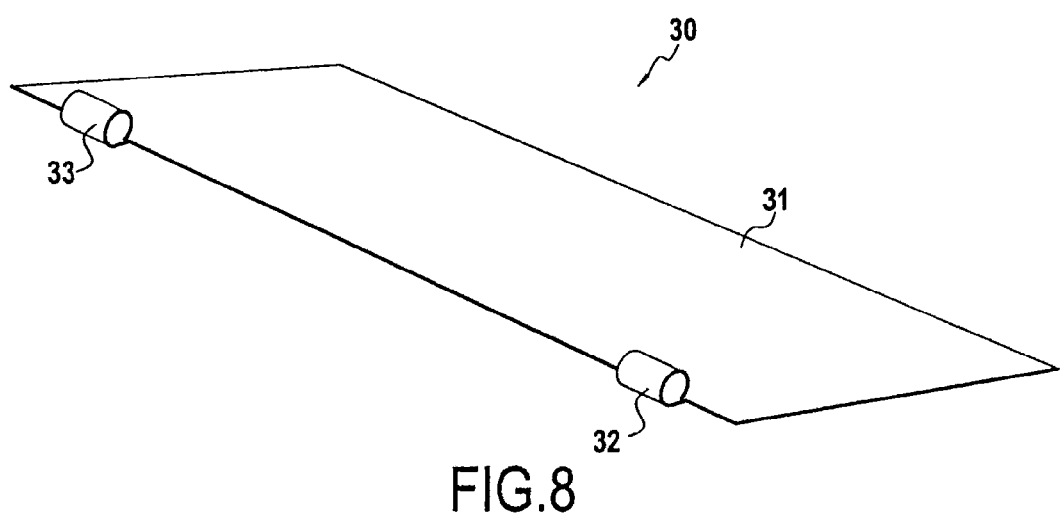
FIG. 8 is a perspective view of an embodiment of a door provided with hinges of the invention.
Figure 9A:
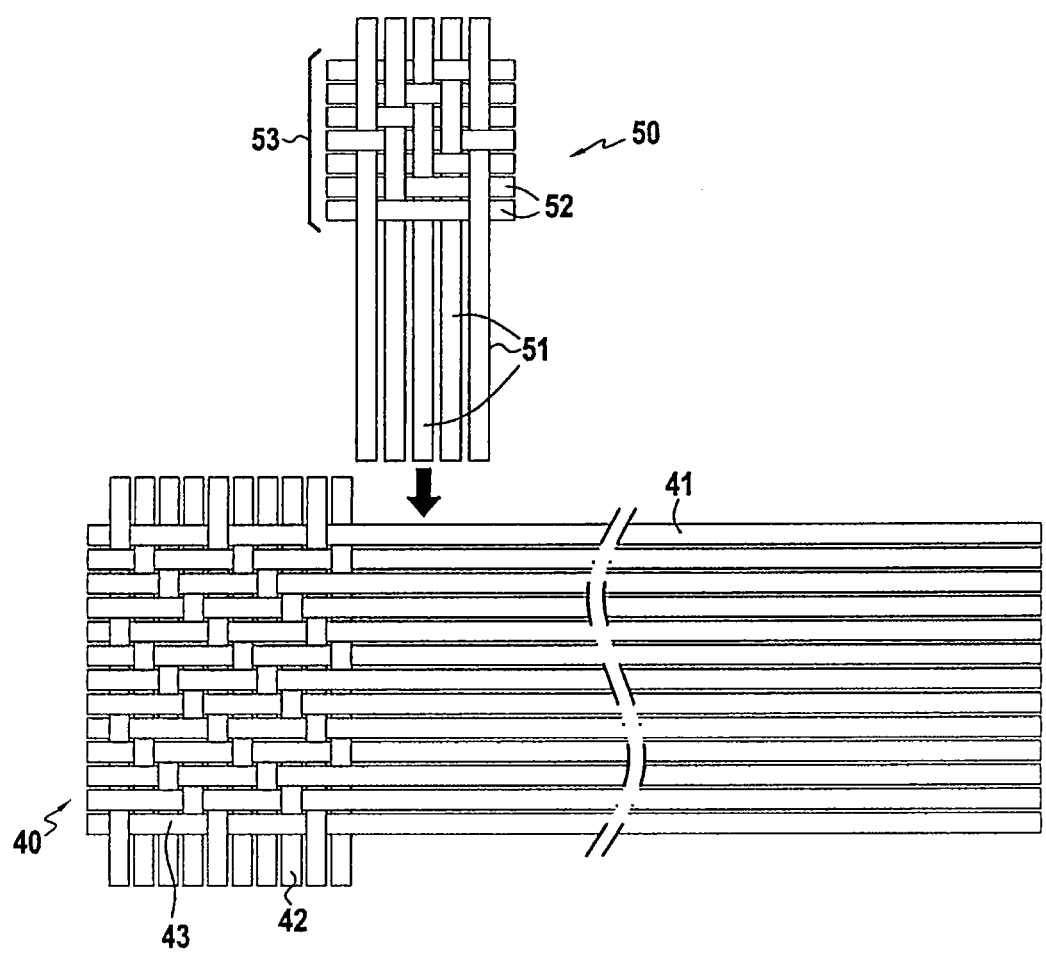
FIGS. 9A to 9C are diagrammatic views showing the assembly of a plurality of fiber substructures for making the FIG. 8 door.
Figure 9B:
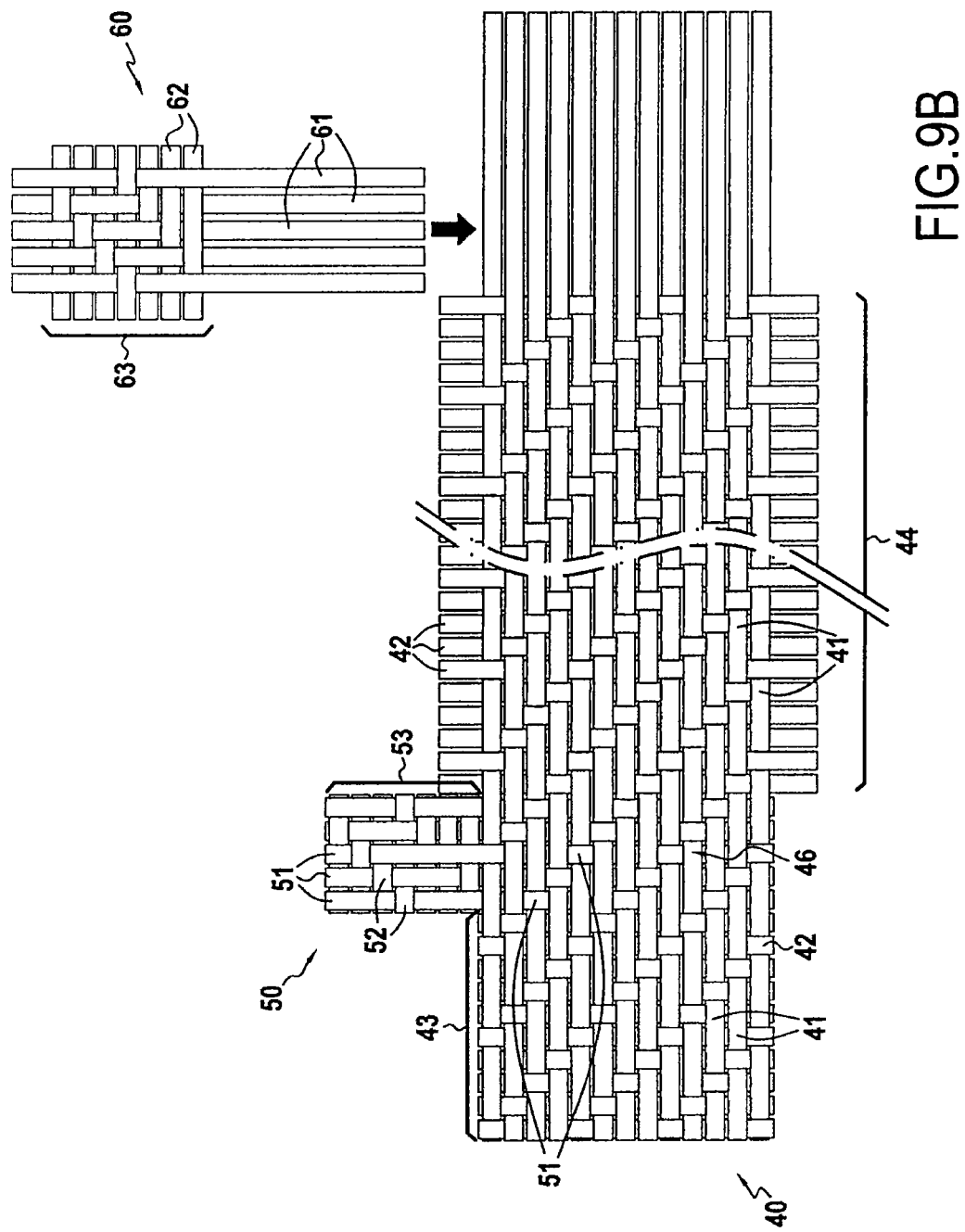
Figure 9C:
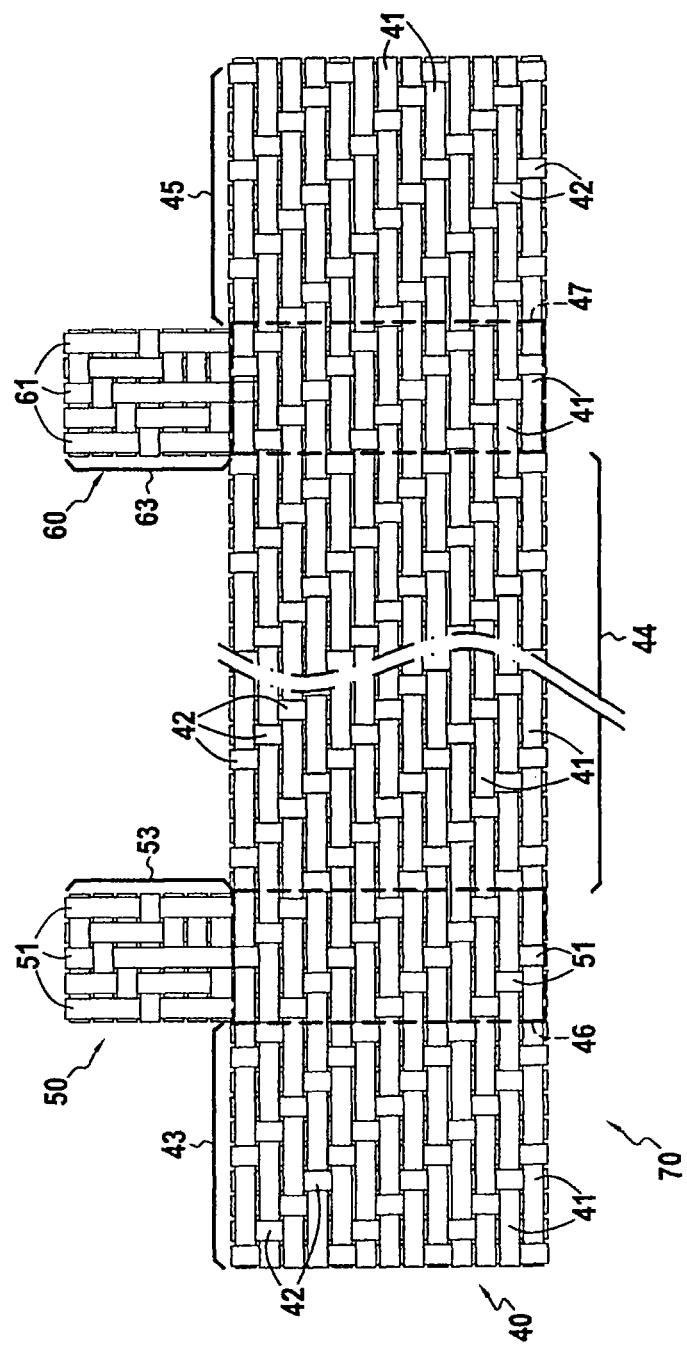

FIG. 8 shows a door 30 comprising a panel 31 having two hinges 32 and 33, which door is made in accordance with the invention and as shown in FIGS. 9A to 9C by assembling together a first fiber substructure 40, which is to form the fiber reinforcement portion corresponding to the panel 31 of the door 30, and second and third substructures 50 and 60, which present independent portions 53 and 63 that are woven with respective warp yarns 51 and 61 and weft yarns 52 and 62 that are to form the fiber reinforcement portions corresponding respectively to the hinges 32 and 33. As shown in FIG. 9A, the first substructure 40 has a first independent portion 43 woven with warp yarns 41 and weft yarns 42, at the end of which the second substructure 50 is assembled thereto by an extra length of warp yarns 51 formed after the independent portion 53 of the second substructure 50. As shown in FIG. 9B, the united substructures 40 and 50 form an assembly portion 46 in which the warp yarns 41 of the first substructure 40 are woven with the extra length of warp yarns 51 of the second substructure 50. After making the assembly portion 46, a second independent portion 44 is formed in the first substructure 40 by weaving the warp yarns 41 with independent weft yarns 42. After making the second independent portion 44, a third substructure 60 is assembled to the first substructure 40 by weaving the warp yarns 41 of the first substructure 40 with the extra length of warp yarns 61 of the third substructure 60 in such a manner as to form a second assembly portion 47 (FIG. 9C). The remainder of the warp yarns 41 of the first substructure 40 are woven with the independent weft yarns 42 so as to form a third independent portion 45 and as shown in FIG. 9C, so as to obtain a fiber structure 70 forming a single piece fiber reinforcement that is suitable, once shaped and densified as described above, for making the door 30 of FIG. 8.

Figure 10:
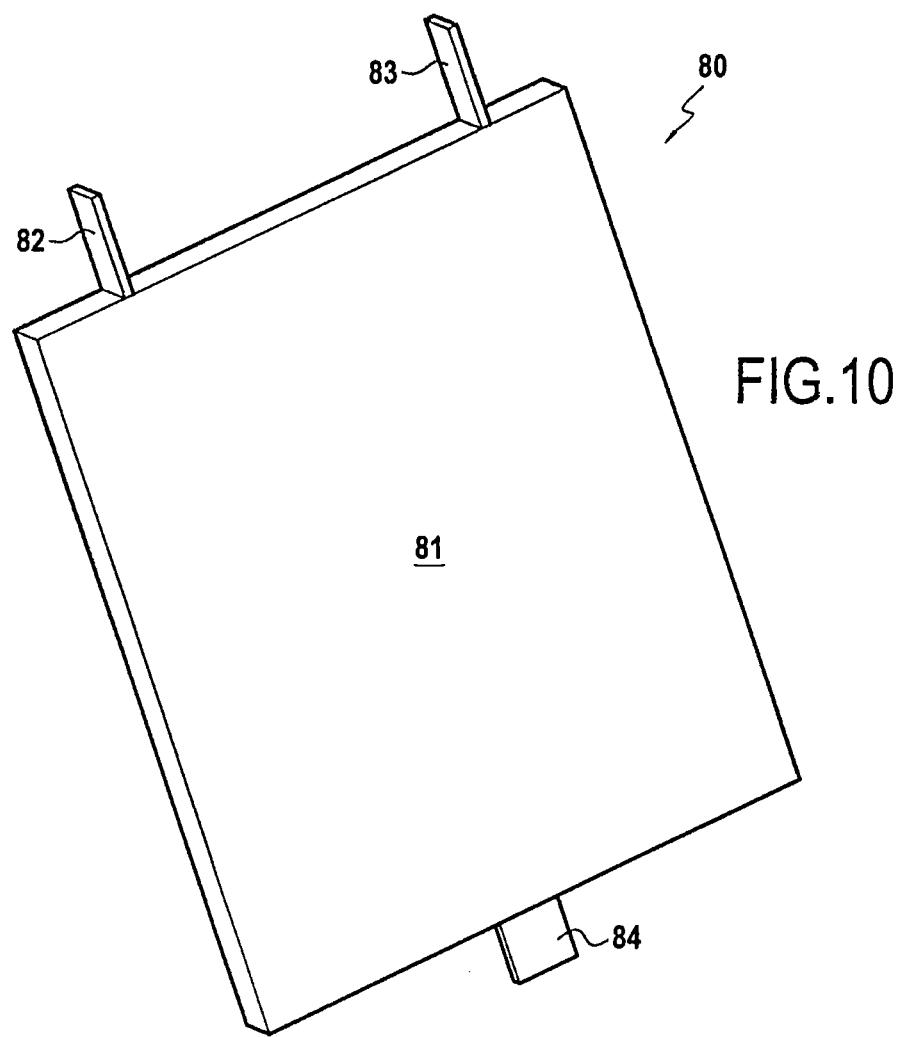
FIG. 10 is a perspective view of an embodiment of a panel provided with an integrated fastener tab and integrated stiffeners of the invention.

FIG. 10 shows a panel 80 comprising a plate 81, two projecting integrated stiffeners 82 and 83, and a fastener tab 84. In accordance with the invention, the warp yarns of the fiber substructures respectively of the stiffeners 82 and 83 and of the tab 84 take the place of the weft yarns of the fiber substructure of the panel 80 in their corresponding assembly portions. This ensures that forces are well taken up, in particular from the stiffeners 82 and 83 and from the tab 84 by the panel 80 as a whole.

Figure 11:
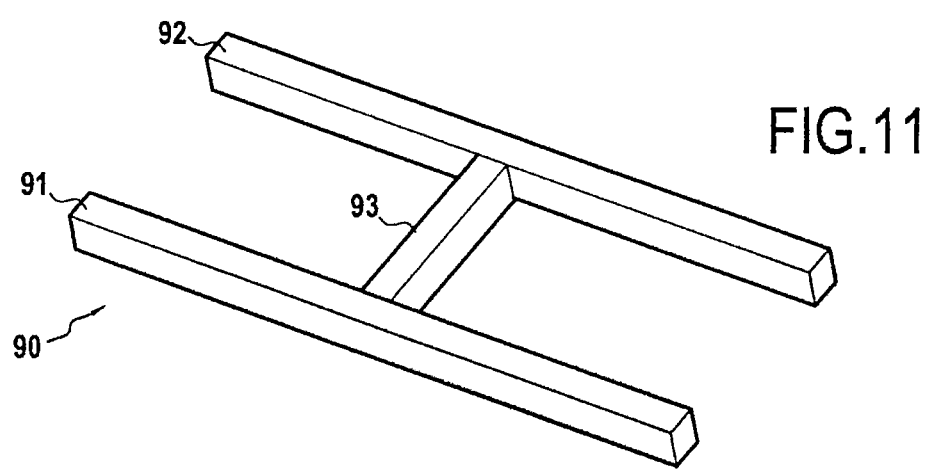
FIG. 11 is a perspective view of an embodiment of a frame of the invention.

FIG. 11 shows a frame 90 made up of two parallel longitudinal length members 91 and 92 that are connected together by a transverse member 93, with the warp yarns of its fiber substructure taking the place of the weft yarns of the fiber substructures of the length members 91 and 92 in their respective assembly portions with the transverse member 93. This ensures that forces are well taken up.

In the above-described embodiments of the invention, adjacent layers of warp yarns of a first fiber substructure are interlinked by warp yarns of a second fiber substructure in the assembly portion. Nevertheless, the invention is not limited to assembly portions in which only the warp yarns of the two substructures are woven together.

The invention also applies to assembly portions in which adjacent layers of warp yarns of a first fiber structure, such as the adjacent layers of warp yarns $C_{T1}$ to $C_{T3}$ of the above-described substructure 100, are interlinked by all or some of the warp yarns of a second fiber substructure, such as the warp yarns $ch'_{11}$-$ch'_{16}$, $ch'_{21}$-$ch'_{26}$, $C'_{31}$-$Ch'_{36}$, and $ch'_{41}$-$ch'_{46}$ of the above-described fiber substructure 200.

The invention also applies to assembly portions in which the layers of adjacent warp yarns of a first fiber structure such as the adjacent layers of warp yarns $C_{C1}$ to $C_{C4}$ of the above-described substructure 100 are interlinked by some or all of the weft yarns of a second fiber substructure, such as the weft yarns $T'_{11}$-$T'_{15}$, $T'_{21}$-$T'_{25}$, and $T'_{31}$-$T'_{35}$ of the above-described fiber substructure 200.

The invention also applies to assembly portions in which the layers of adjacent waft yarns of a first fiber substructure, such as the adjacent layers of weft yarns $C_{T1}$ to $C_{T3}$ of the above-described substructure 100 are interlinked by some or all of the weft yarns of a second fiber substructure, such as the weft yarns $T'_{11}$-$T'_{15}$, $T'_{21}$-$T'_{25}$, and $T'_{31}$-$T'_{35}$ of the above-described fiber substructure 200.

The invention claimed is:
1. A fiber reinforcing structure woven as a single piece for fabricating a composite material part, comprising:
first and second fiber substructures, each fiber substructure comprising at least one independent portion obtained by multilayer weaving between a plurality of layers of warp yarns and a plurality of layers of weft yarns that are independent from the other substructure; and an assembly portion between the at least first and second fiber substructures in which at least a plurality of layers of adjacent warp yarns or at least a plurality of layers of adjacent weft yarns of the first fiber substructure are interlinked by at least some of the warp yarns or at least some of the weft yarns of the second fiber substructure; and wherein, in the assembly portion, at least a plurality of layers of adjacent warp yarns of the first fiber substructure are interlinked by at least some of the warp yarns of the second fiber substructure.

2. A structure according to claim 1, wherein the assembly portion presents a weave similar to the weave of one of the independent portions of the at least first and second fiber substructures.

3. A structure according to claim 1, wherein the assembly portion presents a weave different from the weaves of the independent portions of the at least first and second fiber substructures.

4. A structure according to claim 1, wherein the at least first and second fiber substructures comprise a same number of layers of warp yarns.

5. A structure according to claim 1, wherein the at least first and second fiber substructures comprise different numbers of layers of warp yarns.

6. A structure according to claim 1, wherein the at least first and second fiber substructures comprise a same number of warp yarns per layer of warp yarns.

7. A structure according to claim 1, wherein the at least first and second fiber substructures comprise different numbers of warp yarns per layer of warp yarns.

8. A structure according to claim 1, wherein the at least first and second fiber substructures comprise yarns of a same weight.

9. A structure according to claim 1, wherein the at least first and second fiber substructures comprise yarns of different weights.

10. A composite material part comprising a fiber structure according to claim 1 densified by a matrix.

* * * * *